Figure 1:
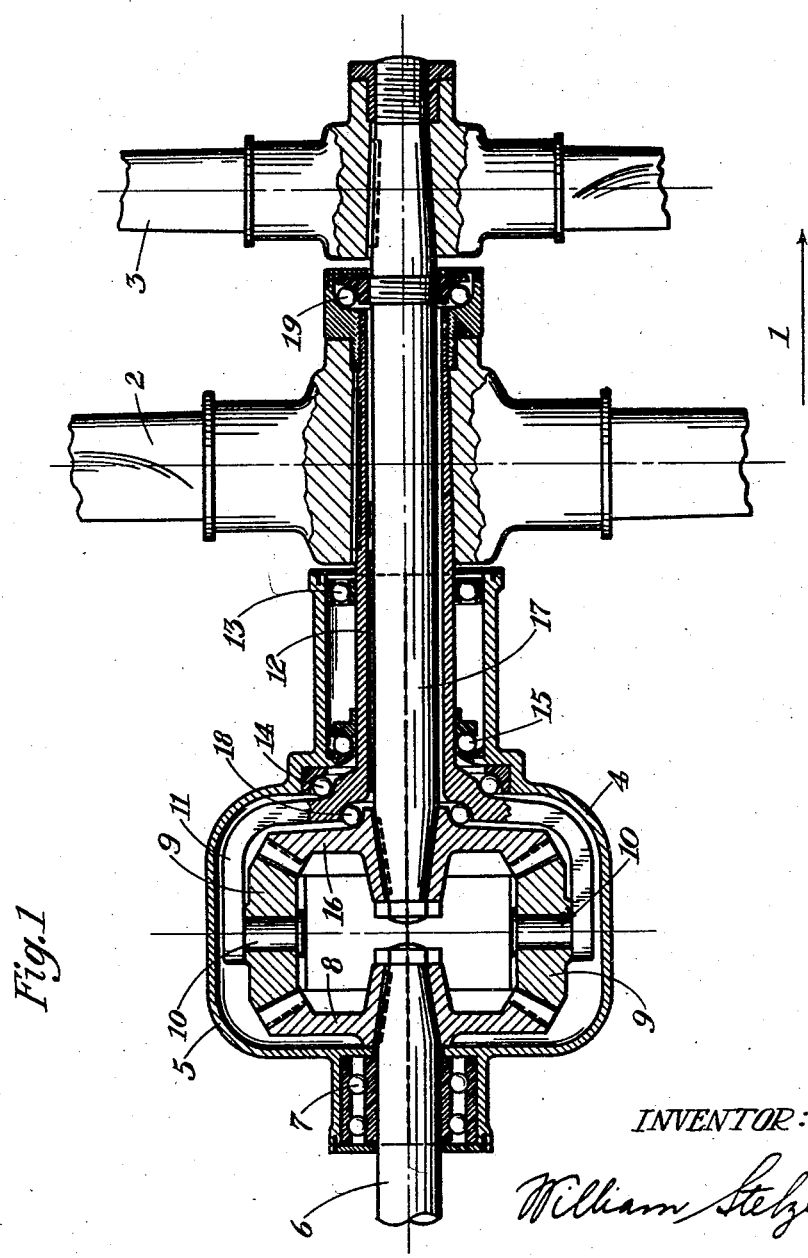

Sept. 1, 1931. W. STELZER 1,821,450
PROPELLING DEVICE FOR AIRCRAFT AND THE LIKE
Filed Sept. 7, 1928  3 Sheets-Sheet 3
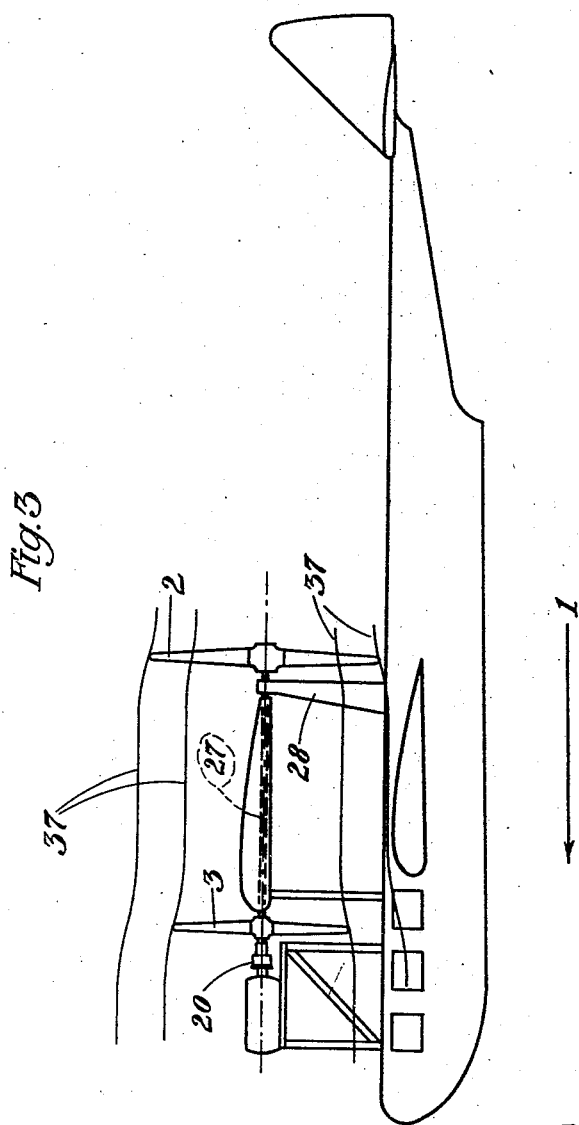
INVENTOR:
William Stelzer Patented Sept. 1, 1931

1,821,450

UNITED STATES PATENT OFFICE

WILLIAM STELZER, OF CHICAGO, ILLINOIS, ASSIGNOR TO AMERICAN PROPELLER COMPANY, OF BALTIMORE, MARYLAND, A CORPORATION OF MARYLAND

PROPELLING DEVICE FOR AIRCRAFT AND THE LIKE

Application filed September 7, 1928. Serial No. 304,477.

The invention relates to an aircraft propulsion system comprising a main propeller and a coaxially arranged counter propeller revolving in opposite direction to that of the main propeller, and a planetary speed reducing gearing, the frame carrying the axes of the planetary gears being connected to the main propeller, and the gear on whose periphery the said planetary gears travel being revoluble and connected to the counter propeller.

The object of the invention is to provide an efficient speed reducing gearing capable of transmitting one and a half times as much power as a standard speed reducing gearing where the gear on whose periphery the planetary gears travel, is stationary.

Another object is to provide a counter propeller revolving in opposite direction to that of the main propeller in order to enable the use of the novel reducing gearing and to increase the propeller efficiency by preventing loss of energy due to race rotation of the air stream.

It is well known that in order to produce thrust, air must be accelerated backwardly, and since the kinetic energy imparted to the air increases with the square of the speed imparted to the air, it is apparently cheaper to increase the mass than the speed. This consideration justifies the employment of large propellers revolving at reduced speed, necessitating the use of a reduction gearing. However, the advantage gained thereby should not be bought at the price of danger. It is therefore an object of the invention to provide a safe and dependable, yet inexpensive gearing. This object is attained by the simplicity and efficiency of the device, which lends itself to smooth action and flexibility of operation.

Fixed counter propellers are employed for ship propulsion to prevent loss of energy due to tangential motion of the water caused by the inner portions of the propeller blades. I aim to incorporate the action of such counter propellers in a propeller revolving in opposite direction to that of revolution of the main propeller. Loss of energy due to tangential motion of the air in the slip stream ranges from one per cent in a fast rotating propeller to twelve per cent of the power input in a propeller revolving at slow speed, such as in the case of the employment of a reduction gearing. As non-rotating counter propellers cause considerable drag and additional weight, I incorporated the desired action in a revolving propeller which at the same time serves to produce thrust, and therefore it is free of the drawbacks of non-rotating counter propellers.

The application of a rotating counter propeller permits the increase of the pitch of the inner portions of the propeller blades so that they may be used to generate thrust. Numerous experiments with ordinary propellers have shown that the increase in pitch towards the axis does not afford any increase of the efficiency worth mentioning. Only when such a propeller is in co-operation with a counter propeller does the employment of a pitch radially increasing towards the axis become reasonable and its advantage become apparent.

I have found that if the counter propeller is forward of the main propeller a larger quantity of air is accelerated than with one propeller of equal diameter, and thereby better efficiency is attained. This may be apparent, as the contraction of the slip stream behind the forward propeller, due to acceleration, draws in air which otherwise would have been outside the propeller disk area. In such an arrangement the forward propeller communicates to the air a tangential motion opposite in direction to that of revolution of the main propeller prior to such air coming into contact with the main propeller. Thus the slip stream of the latter is free of any race rotation, and high efficiency is attained.

Another feature owing to the counter propeller is the opposition of its torque to that of the main propeller.

The invention also aims at a propulsion system causing ultimate conformity of the air flow in the slip stream, and since it is known that the rotation of the air about the propeller blades decreases inversely with the number of blades, it becomes apparent that eddies, which cause loss of energy, are kept at a minimum.

The speed reducing described hereinafter acts as a differential gearing, whereby the torque imparted to the main propeller is twice that imparted to the counter propeller. The speed of revolution of the propellers and their dimensions are inversely related. Thus, for instance, an increase in the diameter or pitch of one propeller will cause a reduction of its own speed of revolution and an increase in that of the other. In this way wide variation of the ratio of the speed of revolution of one propeller to that of the other may be attained.

Figure 2:
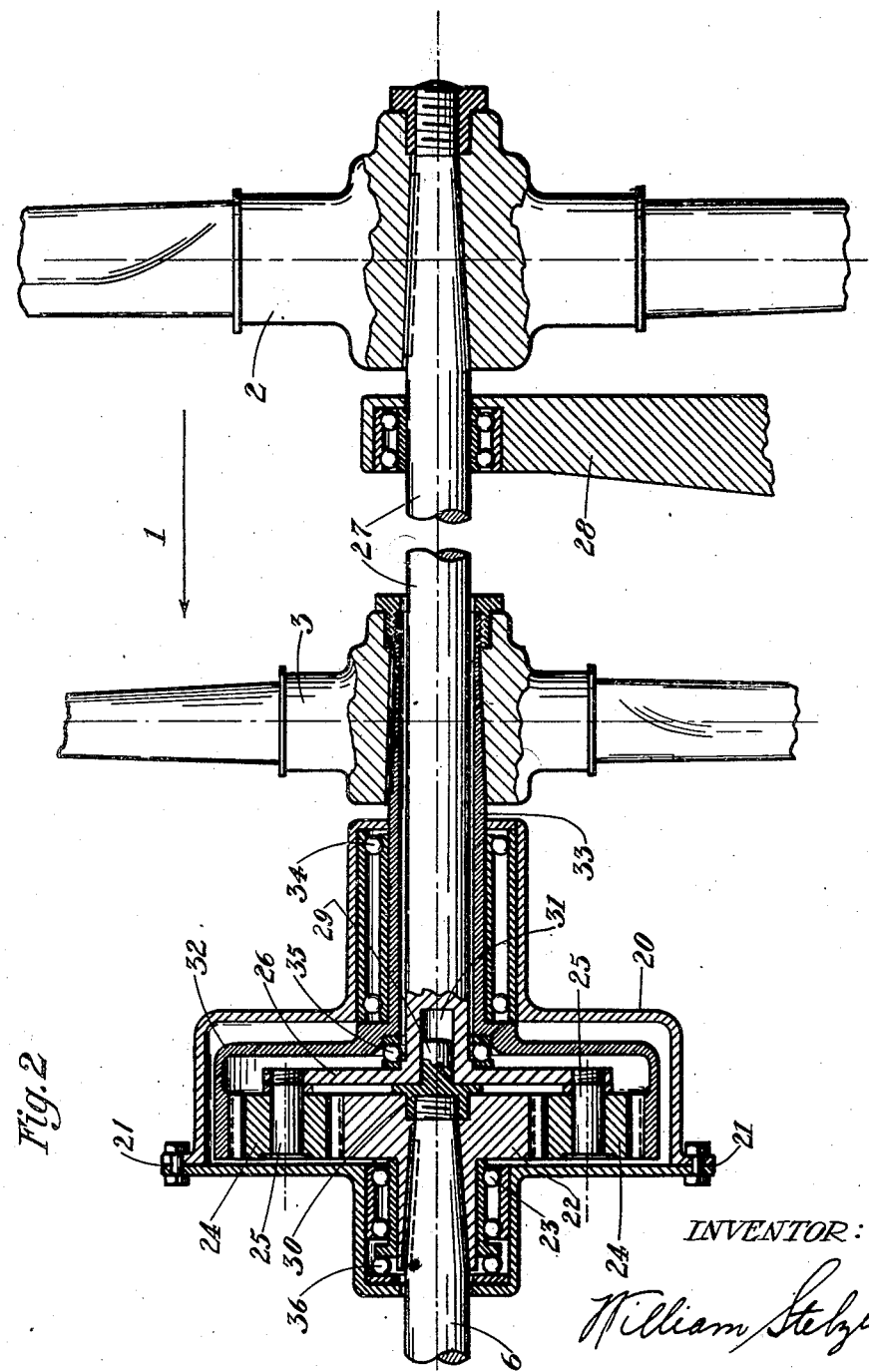

Other objects may appear by inspection of the drawings, wherein:

Fig. 1 is a sectional view of the reducing gearing and the propellers, with the blades broken off in order not to encumber the drawings, Fig. 2 is a sectional view illustrating a modified form of the invention, and Fig. 3 illustrates how one embodiment of the invention, as shown in Fig. 2, may be applied to a seaplane, the counter propeller being shown of smaller diameter than that of the main propeller to illustrate how such an arrangement affords an increase of the quantity of air passing through the propeller disk area due to the contraction of the slip stream.

The terms employed herein are used in the generic and descriptive sense and therefore are not intended primarily as terms of limitation.

The direction of traction of the device is indicated by an arrow 1. 2 denotes the main propeller, which is axially alined with the counter propeller 3. This counter propeller 3 is preferably of smaller diameter than that of the first mentioned, as the torque is only half that of the main propeller, and also to utilize the contraction of the slip stream to increase the quantity of air passing through the propeller disk area, an illustration of the air flow being given in Fig. 3 by the lines 37.

Referring to Fig. 1, the embodiment shown is adapted to tractor airplanes, helicopters, and other craft where the propellers are forward of the power plant. The casing 4 and its cover 5 are bolted together and constitute the usual housing for the gearing. This casing 4 may contain oil so that the gears are continuously bathed therein. This housing may be adapted to be secured to the fuselage or to the crankcase of the engine, or it may be embodied therein.

The power or engine shaft 6 is supported in the housing by the usual anti-friction bearing 7 and carries a drive gear 8 engaging a plurality of intermediate bevel gears 9 journaled on stud shafts 10 mounted integral with the drive shaft 6 and carried by the yoke 11 whose elongated hollow hub 12 carries the main propeller which is keyed to it. This hub 12 is revolubly supported in the housing by the ball bearing 13 and the hub bearing 14, which, together with the anti-thrust bearing 15 guards against longitudinal displacement of the hub 12.

The intermediate gears 9 engage the bevel gears 16 keyed to the shaft 17 which is revolubly supported in the hollow hub 12 by the hub bearings 18 and 19 and carries the counter propeller 3. The drive gear 8 and the driven gear 16 are preferably of equal diameter and rotate about the same axis but in opposite directions. As this gear 16 is revoluble the speed reducing gearing operates as a differential mechanism, so that the propellers are self-adjusting in their speed of revolution. It is quite apparent that this construction readily lends itself to adaptability to operation in a disturbed air flow.

The modification illustrated in Fig. 2 entails a planetary gear drive permitting a greater ratio of reduction of the speed of revolution than the form shown in Fig. 1, and it is primarily intended for pusher airplanes and for ship propulsion.

The housing 20 is made up of two pieces which are flanged together at 21. It is shown diagrammatically, as it may take different embodiments to conform with the different types of aircraft or water craft.

The power shaft 6 is keyed to the drive gear 22 supported in the housing 20 by the bearing 23. This drive gear 22 meshes with a multiplicity of planetary gears 24 journaled on studs 25 carried by the revoluble plate 26 formed on the shaft 27 which is axially alined with the power shaft 6 and carries the main propeller 2. The shaft 27 is revolubly supported by a stand or joist 28 secured to the frame structure of the airplane, and by a cylindrical extension 29 of the cap 30. The cylindrical extension 29 is adapted to turn in the bore 31 in the head of the shaft 27. Said extension 29 serves as a bearing for the shaft 27, the friction being very small, as the drive shaft 6 and the shaft 27 revolve in the same directions.

The planetary gears 24 mesh with the periphery of a revoluble, internally toothed gear wheel 32 whose elongated, hollow hub 33 turns in the bearing 34 and carries the counter propeller 37 revolving in opposite direction to that of the revolution of the main propeller 2. Motion endwise of the hub 33 and the main propeller shaft 27 is prevented by the annuli of the bearing 34 and the thrust bearing 35, the thrust impressed thereon by the counter propeller 3 being communicated to the principal thrust bearing 36 by the interposed parts, which also transmit the pressure imposed thereon by the main propeller 2.

Referring now to Fig. 3, the operation of the propelling device may readily be understood by inspection of the drawings, which illustrates the advantage gained by making the forward propeller of smaller diameter than that of the rear one, whereby the forward propeller 3 effects a contraction of the slip stream—the stream lines being illustrated by 37—and a resulting increase in the quantity of air passing through the propeller disk area of the main propeller, thereby improving the efficiency considerably.

While there are herein shown and described the preferred embodiments of the invention, it shall nevertheless be understood that the invention can be carried out in ways different from that shown without departing from the spirit and scope of the invention. Thus, for instance, in reference to Fig. 1, each intermediate gear 9 may consist of a larger and a smaller bevel gear revolving in unison about the stud 10, the larger gear being engaged by the drive gear and the smaller one engaging the driven gear. In such an embodiment the torque of the counter propeller may be equal to that of the main propeller. However, the embodiments illustrated in the drawings are preferred, as they are of simpler construction and lighter weight, and the inequality of the effects of the propellers is rather an advantage than a drawback, as it permits the employment of a small counter propeller accompanied by the increase in efficiency mentioned hereinbefore.

Further embodiments, modifications, and variations may be resorted to within the spirit and scope of the invention without departing from its principle.

Therefore, I do not desire to be limited in the application of my invention nor in the appended claims to the particular embodiment, pointed out in the affixed drawings.

I claim:

1. In combination, a drive gear, a driven gear coaxial with said drive gear, intermediate revoluble gears at right angles to said drive gear meshing with said drive gear and with said driven gear to transmit power from said drive gear to said driven gear, means for revolubly supporting said intermediate gears, said means for revolubly supporting said intermediate gears being revoluble about the axis of said drive gear, a counter-propeller, means for connecting said counter-propeller with said driven gear to turn therewith, a principal propeller, and means for connecting said principal propeller with said means for revolubly supporting said intermediate gears to turn therewith, substantially as described.

2. A device such as claimed in claim 1 where the propeller connected to the said driven gear has a substantially smaller diameter than that of the propeller connected to the means for revolubly supporting said intermediate gears, substantially as described.

3. A device such as claimed in claim 1 where the smaller propeller is forward of the larger propeller, substantially as described.

4. In combination, a plurality of axially aligned propellers, speed reduction means for driving said propellers at different speeds, one of said propellers being of less length than another of said propellers and arranged forwardly thereof.

5. In combination, a pair of axially aligned propellers, common means for driving said propellers at different speeds in opposite directions, one of said propellers being of less radial extent than the other and arranged forwardly thereof.

6. In combination, a pair of axially aligned propellers, common means for driving said propellers at different speeds, in opposite directions, said means including combined speed reduction and differential mechanism, one of said propellers being of less length than the other and arranged forwardly thereof.

7. In combination, a main propeller, a counter propeller, common means for driving each propeller at a speed variable in accordance with the torque reaction offered thereby and in opposite directions, said main propeller being axially aligned with respect to said counter propeller, and of greater length.

WILLIAM STELZER.